May 13, 1969 V. R. NILSSON 3,443,691
APPARATUS FOR CONTINUOUS CONTROL OF
THE CONCENTRATION OF A SUBSTANCE
IN A FLOWING LIQUID
Filed Nov. 22, 1966
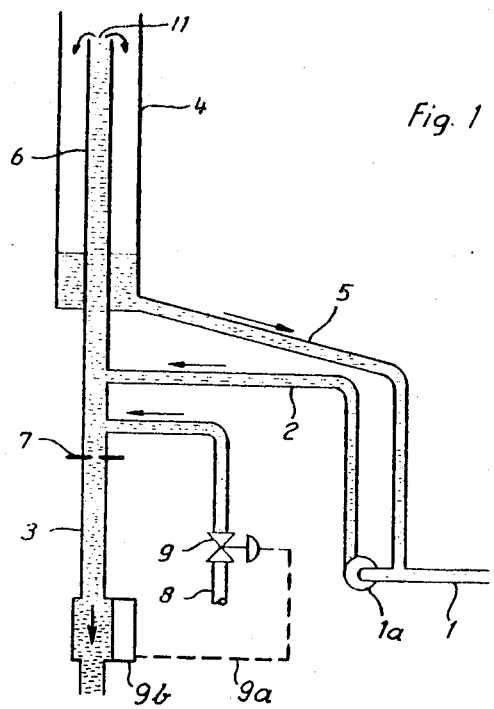
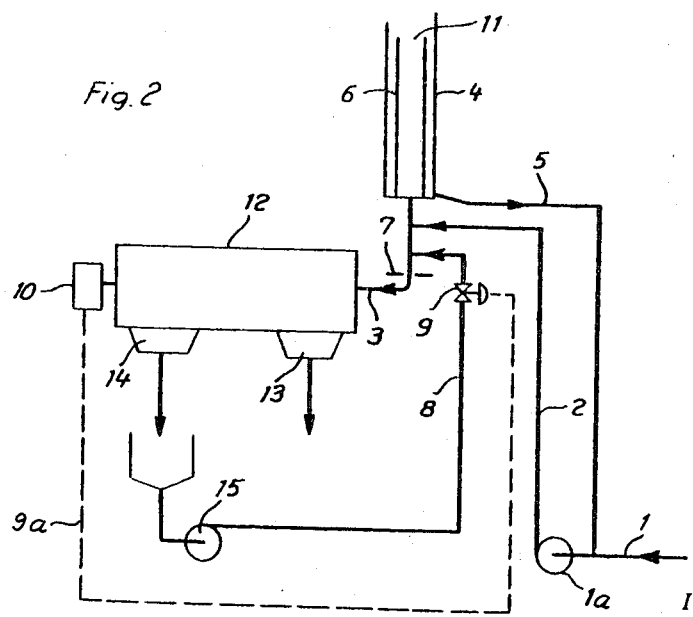
INVENTOR.
Vilgot Raymond Nilsson
BY
Davis, Hoxie, Faithfull & Hapgood United States Patent Office 3,443,691
Patented May 13, 1969

3,443,691
APPARATUS FOR CONTINUOUS CONTROL OF THE CONCENTRATION OF A SUBSTANCE IN A FLOWING LIQUID
Vilgot Raymond Nilsson, Hagersten, Sweden, assignor to Alfa-Laval AB, Tumba, Sweden, a corporation of Sweden
Filed Nov. 22, 1966, Ser. No. 596,310
Claims priority, application Sweden, Nov. 23, 1965, 15,096/65
Int. Cl. B01d 33/38, 23/20
U.S. Cl. 210—96                              4 Claims

ABSTRACT OF THE DISCLOSURE

For continuously controlling the concentration of a substance in a liquid flowing through piping, an apparatus having means for limiting the liquid flow to a predetermined rate and to which a pipe is connected for supplying a further liquid to the flow limiting means, the supply of this further liquid being regulated by a valve controlled by an impulse means which in influenced by the concentration of the aforesaid substance in the resultant liquid mixture.

Disclosure

Apparatus for continuous control of the concentration of a substance in a flowing liquid, as known before, are usually rather complicated and expensive. The principal object of the present invention is to provide a simple and inexpensive apparatus for overcoming problems heretofore encountered with controls of this type. The new apparatus has proved to be very reliable and is suitable for controlling the concentration of a substance suspended or otherwise present in a flowing liquid.

The invention is set forth in further detail in the following description with reference to the accompanying drawing, in which:

FIG. 1 is a diagrammatic view of one embodiment of the invention, and

FIG. 2 is a similar view of a separation plant in which the apparatus according to the invention is used in order to control the concentration of a product dispersed in a liquid which is supplied to a separator of the centrifugal type.

Referring to FIG. 1, a pump 1a is adapted to pump liquid from a supply pipe 1 through pipes 2 and 3, so that there is a continuous flow of liquid through the piping 1, 2 and 3. This piping is provided with means for limiting the liquid flow to a predetermined value. Such limiting means comprise a tube 6 forming an upward extension of pipe 3 and having an open upper end 11 located at a certain height above a throttling device 7 in pipe 3, the throttle 7 having a predetermined throughflow area. Through pipe 2, tube 6 is charged by pump 1a with a liquid, the flow of which is to be limited. The pump is adapted to supply liquid in a quantity per unit of time greater than that discharged by throttling means 7 at the prevailing static pressure, the latter being determined by the height of the open end 11 above the throttling means 7. The excess quantity of liquid per unit of time supplied by the pump, after overflowing the edge of tube end 11, is collected in a container 4 surrounding tube 6 and is returned through an outlet pipe 5 to the suction side of pump 1a A pipe 8 is connected to tube 6 between its open upper end 11 and throttling means 7. Through pipe 8, additional liquid is supplied to tube 6, this supply being controlled by a valve 9 which in turn is controlled through operative connection 9a by means 9b responsive to changes in the concentration of a substance in the liquid mixture flowing through pipe 3 from throttling means 7.

It is obvious that the acidity, for example, of a liquid flowing through pipe 3 may be controlled continuously by means of the above described arrangement. In that case, valve 9 is controlled by means 9b responsive to changes in the acidity of the flowing liquid. If the acidity decreases, valve 9 is opened for increased supply of acid through pipe 8 to tube 6, and conversely. This is an example of how to use the arrangement according to the invention for controlling the concentration of a substance dissolved in a liquid flowing through piping 1, 2 and 3. However, the arrangement is also adapted for continuous controlling of the concentration of a substance which is suspended in the liquid flowing through the piping, as will now be described by way of example.

In FIG. 2, pipe 3 forms the inlet pipe of a sludge centrifuge 12 By means of pump 1a, a suspension of polyvinyl chloride-powder in water is pumped through pipe 2 to tube 6. The centrifuge has a certain capacity and therefore can accept only a certain quantity of suspension per unit of time. This quantity is determined, as described above, by the difference in height between throttling means 7 and the open upper end 11 of tube 6. However, the concentration of PVC in the suspension varies and must be controlled to a value not exceeding the value corresponding to the transporting capacity of the sludge-transporting screw conveyor (not shown) of the centrifuge, which conveyor is of the usual type for conveying the separated PVC-powder to the centrifuge outlet 13. It is desirable on one hand to make use of as much as possible of the separating capacity of the centrifuge, but on the other hand the gearbox or driving means 10 of the centrifuge must not be overloaded. It the suspension flowing through the pipe 3 is too concentrated, such an overloading would occur. The load is sensed by conventional means (not shown) in the gearbox 10 for sensing the torque transmitted to the centrifuge rotor. At a predetermined maximum load, the torque sensing means sends an impulse through connection 9a for opening of valve 9, so that the water phase separated in the centrifuge 12, and discharged through an outlet 14, is supplied by means of a pump 15 to tube 6 through pipe 8. This causes a dilution of the suspension pumped through pipe 2. In this way, the content of PVC in the suspension supplied to the centrifuge through pipe 3 can be continuously kept at an optimum value.

I claim:

1. In an apparatus for continuously controlling the concentration of a substance in a liquid flowing through piping, the combination with said piping of means for limiting the rate of liquid flow through said piping to a predetermined value, a pipe connected to said limiting means for supplying additional liquid to said limiting means and thereby forming a liquid mixture, a valve for controlling the supply of said additional liquid through said pipe, thereby controlling the concentration of said substance in the liquid mixture, sensing means responsive to variations in said concentration in the liquid mixture, and an operative connection between said sensing means and said valve for controlling the valve to maintain said concentration substantially constant, said limiting means include a tube forming an extension of said piping and having an open end, the limiting means also including a throttling device in the piping and located at a predetermined level below said open end, said throttling device having a predetermined throughflow area, said piping being operable to supply liquid to said tube at a rate greater than that discharged through the throttling device.

2. The combination defined in claim 1, comprising also a pump in said piping for supplying the liquid flowing through said piping, a collector surrounding said tube for receiving liquid from said open end of the tube, and an outlet pipe leading from said collector to the suction side of said pump.

3. The combination defined in claim 1, comprising also a centrifugal separator having an inlet connected to said piping for receiving said liquid mixture from the piping, the separator having a driving means, said sensing means being operable to sense the torque transmitted by the driving means.

4. The combination defined in claim 3, in which the separator has a liquid outlet and a sludge outlet, one of said separator outlets being connected to said pipe for supplying said additional liquid to the limiting means.

References Cited

UNITED STATES PATENTS

| | | | |
|---|---|---|---|
| 2,063,140 | 12/1936 | Allison | 210—96 X |
| 2,098,591 | 11/1937 | Neuman | 137—101.21 X |
| 2,243,826 | 5/1941 | Nielsen et al. | 210—96 X |
| 2,269,393 | 1/1942 | Crampton | 210—96 X |
| 2,272,970 | 2/1942 | Frymoyer | 137—92 |
| 2,280,632 | 4/1942 | Cram | 137—92 |
| 2,532,792 | 12/1950 | Svensjo | 137—92 X |
| 2,843,138 | 7/1958 | Gilman | 210—96 X |
| 3,070,291 | 12/1962 | Bergey | 210—101 X |
| 3,085,742 | 4/1963 | Palmquist | 210—101 X |

FOREIGN PATENTS 865,257  2/1953  Germany.

SAMIH N. ZAHARNA, *Primary Examiner.*

JOHN ADEE, *Assistant Examiner.*

U.S. Cl. X.R.

137—92; 210—101, 194, 199